United States Patent [19]

Gill

[11] Patent Number: 5,607,199
[45] Date of Patent: Mar. 4, 1997

[54] REMOVABLE VEHICLE SPOILER

[76] Inventor: Michael J. Gill, Manhattanville Station 365 W. 125 St., New York City, N.Y. 10027

[21] Appl. No.: 524,893

[22] Filed: Sep. 7, 1995

[51] Int. Cl.$^6$ .................................................. B62D 35/00
[52] U.S. Cl. ............................................................ 296/180.1
[58] Field of Search ............................. 296/180.1, 180.2, 296/180.3, 180.4, 180.5

[56] References Cited

FOREIGN PATENT DOCUMENTS 3-578  1/1991  Japan ................................. 296/180.1

Primary Examiner—Andrew C. Pike

[57] ABSTRACT

A rear deck lid wing has two pedestals which rotate tighten and slide through a track from left to right for the ability to be installed on various trunk lids. There are two end pieces with brackets that clip under the lip of the trunk lid and fasten with screws and a center piece that can be cut to size for various width trunk lids. It can also be equipped with a third brake light.

1 Claim, 2 Drawing Sheets

FIG 3
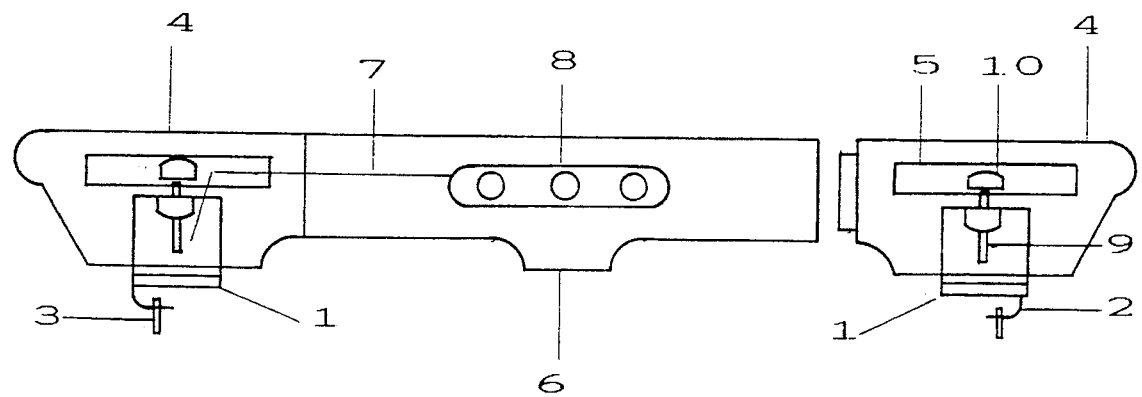
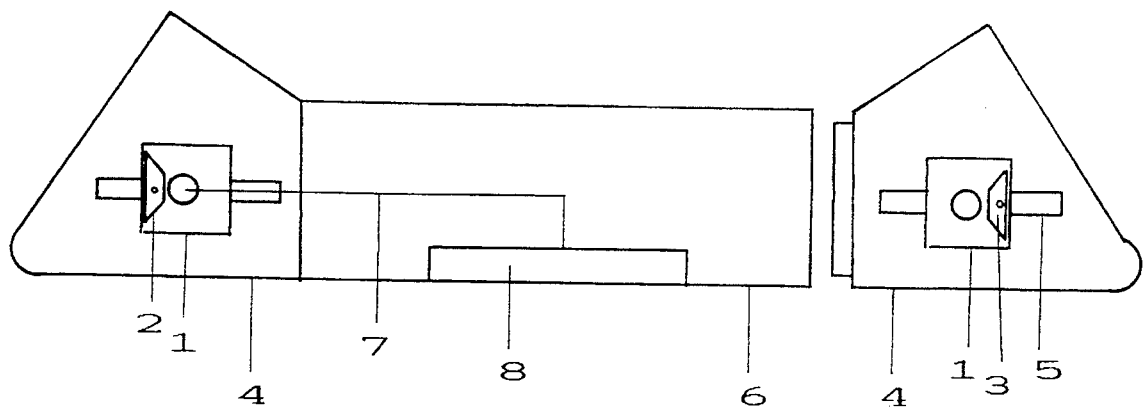
FIG 4

REMOVABLE VEHICLE SPOILER

The present invention "THE GILWING" is a fiberglass rear deck wing (spoiler) for installation on automobile trunk lids and it is unique in the installation features compared to the patents that are listed below:

1) U.S. Pat. No. 5,074,612 Inventors LIESE ET AL.
2) U.S. Pat. No. 4,659,130 Inventors DIMORA ET AL.L
3) U.S. Pat. No. 5,346,274 Inventors SYAMAL ET AL.
4) U.S. Pat. No. 5,141,281 Inventors EGER ET AL.
5) U.S. Pat. No. Des. 322,239 Inventor TAYLOR

BACKGROUND OF THE INVENTION

1. Field of the Invention

The present invention relates to a rear deck lid wing (spoiler) for automobiles that can be easily installed by brackets rather than measuring for, and drilling holes in, the trunk lid of the vehicle; it can also be removed without damage to the vehicle. The material matter consist of fiberglass, metal, rubber, and plastic.

2. Description of the Prior Art

The prior art specifications note that all other deck wings have to have holes drilled for the installation of the wing, sometimes three or four, and if or when removed, repairing of the trunk lid will exist. The present invention solves the problem by being installed with brackets. The prior art patents are listed below:

1) U.S. Pat. No. 5,074,612 Inventors LIESE ET AL.
2) U.S. Pat. No. 4,659,130 Inventors DIMORA ET AL.L
3) U.S. Pat. No. 5,346,274 Inventors SYAMAL ET AL.
4) U.S. Pat. No. 5,141,281 Inventors EGER ET AL.
5) U.S. Pat. No. Des.322,239 Inventor TAYLOR In reviewing the above-listed prior art patents it will be noted that the basic concept of the invention may be generally known and the present invention still discloses features which are not shown in any of the located prior art.

SUMMARY OF THE INVENTION

The object of the invention is to change the appearance of a vehicle when necessary and be able to use the GILWING on other vehicles for the purpose of styling and can be installed with one tool on various width trunk lids by the use of only two brackets that are secured with set screws instead of any drilling and the present invention discloses features that are still not shown in any of the prior art patents.

BRIEF DESCRIPTION OF THE DRAWINGS

The present invention will be more fully understood by reference to the following detailed description thereof when read in conjunction with the attached drawings, and wherein:

FIG. 1 is a rear view of the pedestal and track which is the main unique problem solving concept of the present invention.

FIG. 2 is a side view of the pedestal and track which is the main unique problem solving concept of the present invention.

DETAILED DESCRIPTION OF THE PREFERRED EMBODIMENTS

Figure 3:
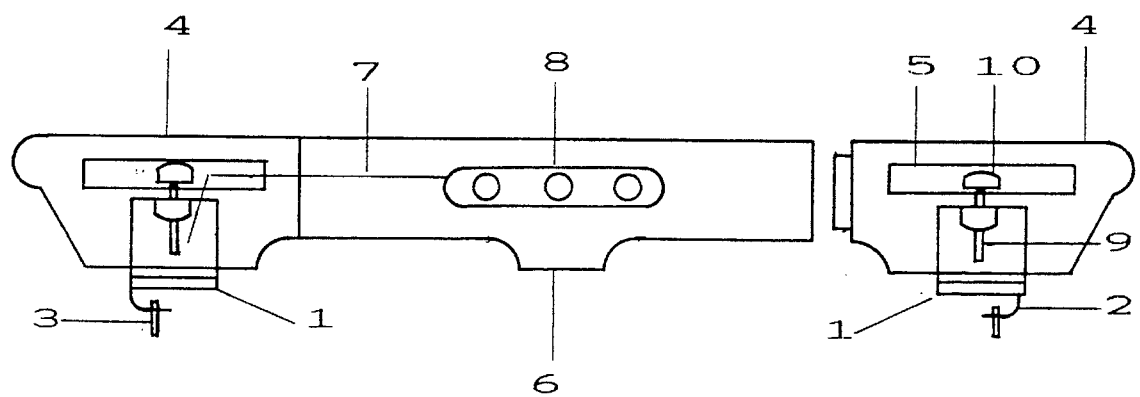
FIG. 3 is a rear view of the Gilwing unit.
Figure 4:
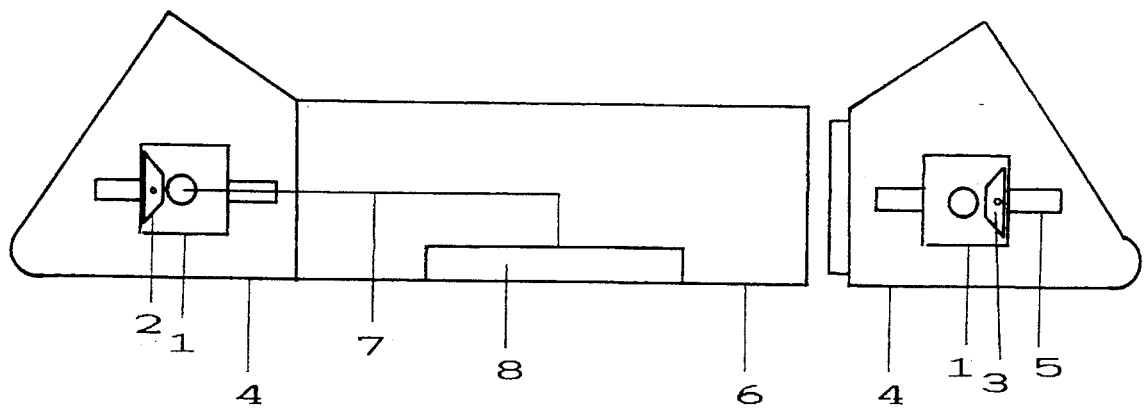
FIG. 4 is a bottom view of the Gilwing unit.

The fiberglass rotating pedestals #1 attach to the trunk lid with metal brackets #2 and are secured by metal set screws #3. The pedestals #1 can be adjusted by sliding back and forth in the metal track #5 which is guided by the metal guide #10 for various trunk widths. The pedestals #1 rotate on a theaded rod #9. The two fiberglass end wings #4 are secured more firmly after the center fiberglass section #6 is installed which can be cut to size. The plastic third brake light #8 is equipped with an insulated wire #7 that does not require any drilled holes to be operated; it fits through the hollow metal threaded rod #9.

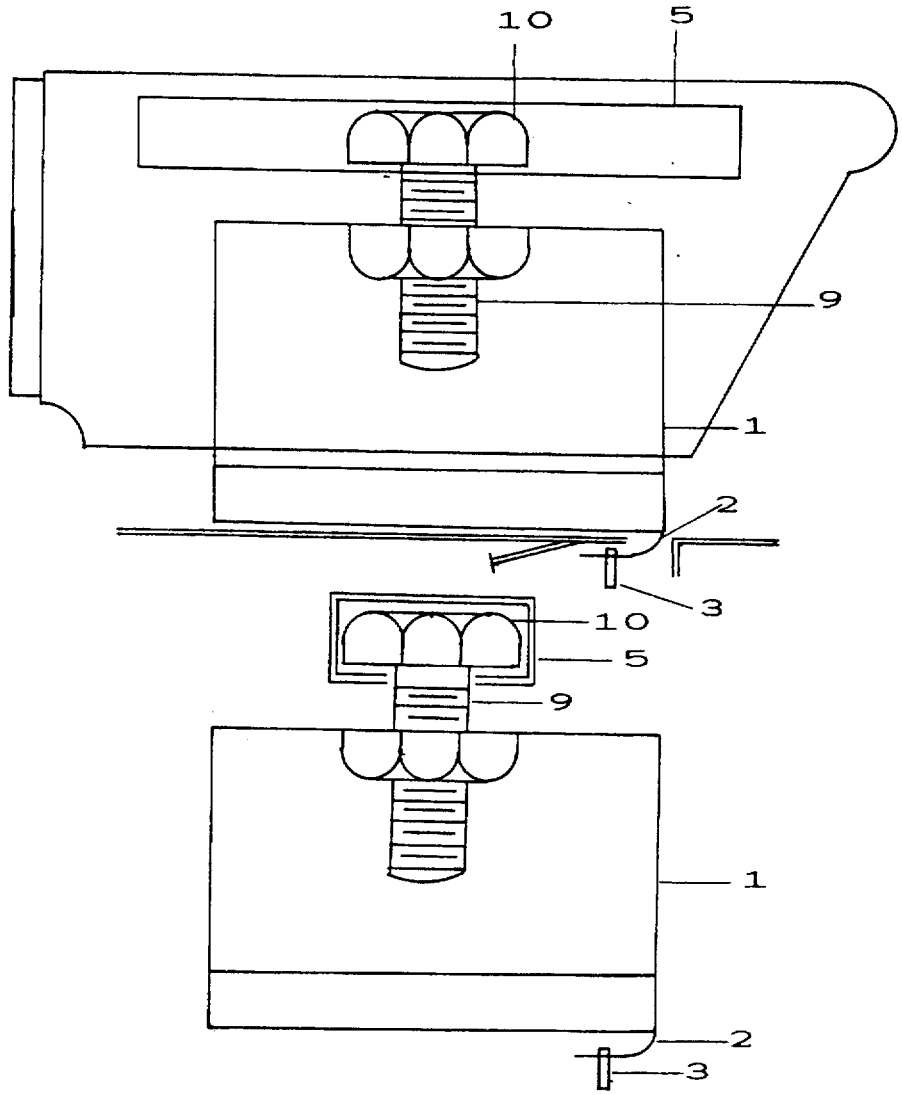

What I claim as my invention is:

1. A removable vehicle spoiler for a vehicle including a trunk lid having a width and a lip, said spoiler comprising a wing, two pedestals rotatably and slidably mounted on said wing to fit the trunk lid width, a bracket on each said pedestal for removably attaching each said pedestal under the lip of the vehicle trunk lid, and a set screw on each said bracket to tighten and secure each said pedestal firmly in place under the lip.

* * * * *

UNITED STATES PATENT AND TRADEMARK OFFICE
CERTIFICATE OF CORRECTION

PATENT NO. : 5,607,199    Page 1 of 2

DATED : March 4, 1997

INVENTOR(S) :. Michael Gill

It is certified that error appears in the above-identified patent and that said Letters Patent is hereby corrected as shown below:

Delete drawing sheet 1 of 2, and substitute therefore the Drawing Sheet, consisting of Figs. 1 and 2, as shown on the attached page.

Signed and Sealed this

Twenty-second Day of July, 1997

Attest:

BRUCE LEHMAN

Attesting Officer    Commissioner of Patents and Trademarks